United States Patent Office 2,851,451
Patented Sept. 9, 1958

2,851,451

POLYMERIZATION PROCESS

Robert Everett Foster, New Castle, and Gerald Messner Whitman, Hockessin, Del., assignors to E. I. du Pont de Nemours and Company, Wilmington, Del., a corporation of Delaware No Drawing. Application September 1, 1954
Serial No. 453,694

5 Claims. (Cl. 260—94.9)

This invention relates to an improved process for polymerizing ethylene.

Solid polymers are obtained when ethylene, in the vapor phase, is subjected to pressures of the order of 500 to 3000 atmospheres and temperatures of from 100° to 400° C., in the presence of catalytic amounts of molecular oxygen. Although the process is used successfully in the commercial production of ethylene polymers, because it employs very high pressures at moderately high temperatures, it is an inherently technically difficult operation, requiring as it does most efficient heat-dissipation, if explosive decomposition is to be avoided. An alternative commercially successful process for producing normally solid ethylene polymers, which solves the heat-dissipation problem but which still employs ultra-high pressures and moderately high temperatures, is that disclosed and claimed in U. S. 2,396,677, issued to M. M. Brubaker on March 19, 1946. In the process of this patent a liquid medium of high heat capacity, e. g., water is used to dissipate the heat of reaction and the polymerization is activated by materials which yield free radicals, e. g., organic peroxides, under the conditions of reaction.

Ethylene polymers produced by either of the above high temperature-high pressures methods have a density in the range of 0.895 to 0.920, a content of amorphous components greater than 22%, a degree of chain branching, expressed as ratio of methyl groups per carbon atoms in the main polymer chain, of more than 1 in 45, and a stiffness modulus of 10,000 to 35,000 lb./sq. in.

Fundamental research on the ethylene polymerization has shown that there are at least two competitive reactions, one leading to chain branching and the other to polymer growth. The structure of the polymer will depend upon the relative rates at which these two reactions take place. Further research work has been addressed primarily at devising conditions which favor the linear chain propagation reaction, at the expense of chain branching, because the lower the degree of chain branching the higher will be the melting point, rigidity, hardness, and workability, i. e., adaptability to extrusion, of the polymer. Rate of polymerization is increased by the use of high pressures but the higher the pressure the higher, equipment costs, and, hence, plant investment. The development of a process employing moderate pressures and temperatures to produce high grade polymer accordingly has been a much sought research objective.

This invention provides a process for producing high molecular weight ethylene polymers possessing a combination of high stiffness, high tensile strength, high melting point, and high degree of linearity.

According to this invention ethylene is polymerized to high quality polymers by contacting the ethylene with a solid catalyst comprising as an essential component a reduced phosphomolybdic acid of the general formula $P_2Mo_{20-24}O_{3-51}$.

In a convenient and practical method of operation, a pressure reactor of about 400 ml. capacity is charged with catalyst and an organic reaction medium, e. g., xylene, in amount sufficient to occupy about one-fourth of the reactor volume. The charged reactor is swept with oxygen-free nitrogen and is cooled to about −35° C. The reactor is then pressured with ethylene and the charged reactor placed in a reciprocating rack equipped with heating means. Heating and agitation are started and when the temperature has reached that selected for operation the pressure is adjusted to the desired level by admitting ethylene under pressure. The reaction is permitted to proceed for at least 6 hours, during which time the pressure is maintained by periodic injections of ethylene. Thereafter the reactor is permitted to cool, opened, and the contents removed. The reaction product is a tough solid which is subjected to fractional extraction with an organic solvent, such as, xylene. The extract is diluted with a non-solvent for the ethylene polymer, e. g., methanol and the polymer that separates is filtered and dried at room temperature.

The examples which follow are submitted to illustrate and not to limit this invention.

*Example I*

A mixture of 7.2 g. of a reduced phosphomolybdic acid, prepared as described subsequently, 0.8 g. of magnesium turnings, 87 g. (100 ml.) of purified mixed xylene, and ethylene was heated in a silver-lined reactor of 400 ml. capacity at 100° to 225° C. and under an applied ethylene pressure of from 500 to 2500 lb./sq. in. for 12 hours. Consumption of ethylene began at once and continued throughout the heating period, during which time the pressure was maintained by addition of ethylene as required. During the 12-hour reaction period, there was an observed pressure drop corresponding to about 3535 lb./sq. in. The product consisted of solid polymer containing catalyst. After removal of the solvent in a vacuum oven, the tough solid product weighed 85 g. Of this amount, 8 g. was the weight of catalyst and the weight of ethylene polymer was therefore 77 g. To separate the polymer from catalyst, a portion of the product was extracted with boiling xylene, precipitated from the xylene solution with methanol, and centrifuged. The purified polymer had an inherent viscosity of 3.16–4.31, measured at 0.1% concentration in tetrahydronaphthalene at 125° C. This high viscosity indicated a very high molecular weight. Films of the polymer obtained by pressing at 170° C., and 15,000 lb./sq. in. pressure were transparent and could be cold-drawn. These films had a stiffness of 87,719 to 118,406 lb./sq. in. and a tensile strength of 2551 to 3333 lb./sq. in. at 1054 to 1428% elongation.

In an experiment similar to the above using zinc in place of the magnesium, ethylene polymer was obtained with an inherent viscosity of 3.03 at 0.1% concentration in tetrahydronaphthalene at 125° C. Films prepared from this polymer had a stiffness modulus of 107,427 to 112,732 lb./sq. in. and a tensile strength of 2720 lb./sq. in. at 980% elongation.

In an experiment similar to Example I, except that the top operating pressure was 1500 lb./sq. in., polymer was obtained with an inherent viscosity of 5.21 at 0.1% concentration in tetrahydronaphthalene at 125° C. Films prepared from this polymer showed a stiffness modulus of 96,061 to 128,571 lb./sq. in. and a tensile strength of 2760 lb./sq. in. at 960% elongation.

In experiments similar to Example I, polymers having inherent viscosities 2.64 to 3.20 at 0.1% concentration in tetrahydronaphthalene at 125° C. were obtained.

Parallel experiments using sodium, molybdenum and lithium hydride, respectively, in place of magnesium gave similar results.

The reduced phosphomolybdic acid used in the above experiments was prepared as follows:

Commercial, analytical grade phosphomolybdic acid of composition by analysis corresponding to the formula $2(H_3PO_4) \cdot 22MoO_3 \cdot 49H_2O$ was dehydrated to constant weight by heating at 200° C. The theoretical yield of anhydride assuming the reaction

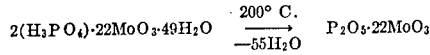

is 77%. Actual yields varied within the limits 77–78%. The anhydride was hygroscopic and was stored in tightly sealed containers.

One hundred milliliters (ca. 150–170 g.) of the anhydrous phosphomolybdic acid in either powder or granular form was placed in a 45 mm. Pyrex tube, 34 inches long, with ground glass fittings on each end providing for a hydrogen inlet and exit, and a Pyrex thermocouple well penetrating through the catalyst bed. The catalyst rested on a plug of Pyrex glass wool. The reduction tube was placed in a split-type furnace, 18 inches long mounted at an angle of about 10° from horizontal.

Standard cylinder hydrogen was passed first through activated charcoal and then over copper at 400° C. to a drying train consisting of a series of "Drierite" towers, followed by $P_2O_5$ driers and then to the reduction tube. The hydrogen passed through the catalyst bed at a space velocity of 1000 hrs.$^{-1}$ and exited through a condenser and dryer to collect and measure water formed during reduction. Hydrogen flow was started at room temperature and the furnace was heated up to 400° C. (catalyst bed temperature) in a period of 4.5–5.0 hours and held at 400° C. for 24 hours. The furnace was then cooled to room temperature with hydrogen flowing at a diminished rate. At room temperature, the system was flushed with deoxidized nitrogen and the reduced catalyst was discharged directly into a specially designed Pyrex glass dispenser under nitrogen from which samples were drawn through a large bore stopcock into glass tubes in an atmosphere of nitrogen and sealed with a torch.

As reduction proceeded, the catalyst passed through a series of visible color changes starting from yellow at room temperature, changing to dark green about 250° C., to deep blue around 350° C., and finally to black at 400° C. Water formed during reduction did not appear in significant amounts below 400° C.

The reduced phosphomolybdic acid analyzed 73.4% molybdenum and 1.89% phosphorus, was amorphous to X-rays, and had a surface area of 177 sq. m./g., determined by the B. E. T. method. Its average composition corresponded to $P_2Mo_{25}O_{50.6}$.

*Example II*

Example I was repeated using a catalyst consisting of reduced phosphomolybdic acid and magnesium, prepared as described below. With this catalyst ethylene polymer was obtained at the rate of 1 g. per gram of catalyst per hour.

The catalyst used in the above experiment was prepared as follows:

An intimate mixture of anhydrous phosphomolybdic acid, prepared as in Example I, and powdered magnesium, in the proportions 12 parts to 1 part by weight was produced by grinding in a porcelain ball-mill with pebbles for a period of 8 hours in an atmosphere of oxygen-free, dry nitrogen. The finely ground mixture was shaken through a 35 mesh screen, pelleted or granulated to the desired size and redried to constant weight at 200° C. This mixture was reduced in hydrogen in a manner similar to that described in Example I for phosphomolybdic acid alone. The temperature of reduction was maintained at 400° C. for 18 hours, and then raised step-wise at one-hour intervals from 425° to 450° C., and finally to 475° C. When the 475° C. temperature level was reached, the reduced granules were black, containing silvery specks of magnesium. The reduction at 475° C. was then continued until the silvery specks of magnesium began to swell and turn white. This usually required no more than one hour. The transition point was not difficult to detect, because the white phase began to be visible at the upper surface of the catalyst bed. The catalyst was then cooled to room temperature as quickly as possible in a hydrogen atmosphere and discharged as described in Example I. The catalyst was black, with silvery magnesium specks, and was very pyrophoric.

*Example III*

Using the apparatus described in Example I, ethylene was polymerized at 200° to 225° C. and 2200 to 2500 lb./sq. in. pressure with 6.7 g. of a reduced phosphomolybdic acid as the sole added catalyst, prepared as described below, and there was thus obtained polymer at the rate of 2 g. per gram of catalyst per hour.

The reduced phosphomolybdic acid was prepared as described in Example I, except that the reduction was effected at 400° C. for 41 hours. The product analyzed 75.27% molybdenum and 2.10% phosphorus and had a surface area of 195 sq. m./g., as determined by the B. E. T. method. Its average composition corresponded to $P_2Mo_{22}O_{36}$.

*Example IV*

Example I was repeated using 7 g. of a reduced phosphomolybdic acid as the sole added catalyst, prepared as described below. There was obtained 51 g. of solid high molecular weight ethylene polymer.

The catalyst used in the above experiment was prepared as described in Example I, except that the reduction was carried out at 500° C. for 24 hours. The product analyzed 80.75% molybdenum and 2.34% phosphorus and its average composition corresponded to $P_2Mo_{22}O_{27}$.

*Example V*

An equimolar mixture of ethylene and carbon monoxide was heated in xylene solvent under conditions as described in Example I, in the presence of 8.7 g. of reduced phosphomolybdic acid and 0.9 g. magnesium turnings. There was obtained a polymeric solid, which was filtered and extracted with boiling benzene to remove 0.1 g. of low molecular weight polymer. Extraction with xylene, followed by precipitation with methanol, yielded 1.6 g. of higher molecular weight polymer which could be molded into coherent film. Both the low and high molecular weight polymers showed the presence of carbon monoxide by infrared spectral examination.

The catalysts used in the practice of this invention comprise as the essential component a reduced phosphomolybdic acid corresponding to the general formula $$P_2Mo_{20-24}O_{3-51}$$

The preferred reduced phosphomolybdic acid catalysts for use in the practice of this invention, from the standpoint of activity and yield of desired high molecular weight ethylene polymer, are those which conform to the formula $P_2Mo_{22-24}O_{20-42}$.

In preparing these reduced phosphomolybdic acids a phosphomolybdic acid is placed in a heat resistant tube mounted within an electric furnace, and hydrogen alone, or hydrogen admixed with a diluent gas, such as nitrogen or carbon monoxide is passed over the charge at atmospheric pressure at a rate corresponding to a space velocity of at least 500 reciprocal hours, while the temperature is raised from that of the room (ca. 22° C.) up to above 350° C. at the rate of 50° to 85° C. per hour. The reduction is continued under these conditions for a period which is usually at least 5 hours.

Thereafter, the charge is permitted to cool to room temperature in a nonoxidizing atmosphere, flushed at room temperature with nitrogen, and stored under nitrogen, helium, or other inert gas.

The precise composition of the reduced phosphomolybdic acid depends upon such variables as temperature and time of reduction used. The reduction is conducted at temperatures of 350° to 500° C. until the valence of the molybdenum has been reduced to below 4. The surface area will be in the neighborhood of 50 sq. m./g. or greater, the most active compositions, however, being those having areas above 100 sq. m./g. and these constitute the preferred catalysts.

The physical form of the reduced phosphomolybdic acid is not critical and it can be used successfully in the form of a powder, or as pellets or granules, which are suitable for use in continuous flow operations.

In the examples the reduced phosphomolybdic acid has been used unextended. If desired, however, it can be employed extended on such supports as carbon, silica gel, alumina, kieselguhr, and the like.

The phosphomolybdic acids used as starting materials are commercially available phosphomolybdic acids containing phosphorus to molybdenum atomic ratios varying from 1:10 to 1:12. Other phosphomolybdic acids containing phosphorus to molybdenum ratios outside this range, for example, those in which the ratios are as low as 1:2.5 give reduced products usefully employable in the process of this invention.

In some instances the activity of the reduced phosphomolybdic acid catalyst may be enhanced by small amounts of metals, e. g., notably zinc, sodium, molybdenum, and magnesium, or metal hydrides, e. g., lithium hydride, calcium hydride, lithium aluminum hydride, etc. These promoters are not indispensable, but they are effective when used in amounts up to 20% by weight of the reduced phosphomolybdic acid. They are especially valuable when the pre-reduction has not been continued to the point at which optimum results are obtained.

The promoting metal may be in finely divided form or as turnings and may be conveniently incorporated into the preformed reduced phosphomolybdic acid by simple mixing or it may be added to the phosphomolybdic acid prior to reduction.

The particular pressure at which the polymerization is conducted depends upon such interdependent factors as temperature and activity of catalyst. As a rule it is not necessary to use pressures in excess of 3000 lb./sq. in. to obtain good conversions of the ethylene, at reasonable reaction rates, to high grade polymer. Most generally the pressures will be between atmospheric pressure and 2500 lb./sq. in. Especially good results, from the standpoint of polymer quality, yield, and rate of reaction are obtained at pressures within the range from 400 to 2500 lb./sq. in.

The temperature of the polymerization, within limits, is not a critical factor. For practical reason it is preferred to operate under as mild conditions as possible in order to minimize power requirements and simplify equipment design. The temperature may vary from that of the room to 250° C. With active catalyst and pressures of 400 to 2500 lb./sq. in. the temperature will be between 80° and 225° C.

In the working examples the amount of catalyst has ranged from 2 to 10 g. This is not critical and larger or smaller amounts may be used if desired, depending upon the mode of operation, i. e., whether batch or continuous or semicontinuous, with recycling of unconverted ethylene.

Under the preferred conditions of temperature and pressure in a bath process employing from 2 to 10 g. of catalyst in a 400 ml. reactor, the time of reaction will usually be about 6 to 15 hours. If desired, however, this time may be lengthened or shortened by varying the conditions of operation.

The examples have illustrated polymerization in the presence of a reaction medium and a particularly useful one is xylene. In place of xylene there can be used other media such as benzene, toluene, cyclohexane, heptane, isooctane, halogenated hydrocarbons, etc. If desired, however, the polymerization may be effected in the absence of a reaction medium.

The amount of reaction medium in a batch process operated in a 400 ml. reactor will generally be that required to occupy about 25% of the reactor volume. Larger or smaller amounts may be used, if desired.

The process of this invention is a marked improvement over prior methods for polymerizing ethylene in that it employs mild conditions of temperature and pressure and hence minimizes equipment requirements and the complex technical problems associated with ultra-high pressure-high temperature processes. Especially significant from the standpoint of practical economic operation, is the operability of the process of this invention at low pressures, e. g. pressures below 2000 lbs./sq. in. The process also produces ethylene polymer of high molecular weight, i. e., of inherent viscosities in the range of 2 to 5.2, measured at 0.1% concentration in tetrahydronaphthalene at 125° C. These high molecular weight polymers are highly linear, have stiffness modulae of 85,000 to 130,000 lb./sq. in. and tensile strengths of 2500 to 2400 lb./sq. in. at 960 to 1500% elongation. The polymerization is a heterogeneous reaction employing readily accessible catalysts possessing high degree of activity, as reflected by the production of a large amount of polymer per unit weight of catalyst per hour.

We claim:

1. In the process for preparing normally solid ethylene polymers, the improvement which comprises carrying out the polymerization with a polymerization catalyst comprising a reduced anhydrous phosphomolybdic acid, said catalyst containing molybdenum at a valence state below 4.

2. Process of claim 1 wherein the catalyst has the formula $P_2Mo_{20-24}O_{3-51}$.

3. Process of claim 2 wherein the reduced phosphomolybdic acid has been formed by reduction of phosphomolybdic acid with hydrogen at 350° to 500°, said reduction being continued until the valence of the molybdenum has been reduced to below 4, and the surface area of the reduced catalyst is at least 100 square meters per gram.

4. Process of claim 3 wherein the temperature is from 80° to 225° C. and the pressure is from 400 to 2500 lb./sq. in.

5. Process of claim 4 wherein the polymerization is performed in the presence of magnesium metal as one of the ingredients of the reaction mixture.

References Cited in the file of this patent

UNITED STATES PATENTS

| | | |
|---|---|---|
| 2,441,297 | Stirton | May 11, 1948 |
| 2,547,380 | Fleck | Apr. 3, 1951 |
| 2,608,534 | Fleck | Aug. 26, 1952 |
| 2,652,372 | Farlow | Sept. 15, 1953 |
| 2,692,257 | Zletz | Oct. 19, 1954 |
| 2,731,452 | Field | Jan. 17, 1956 |
| 2,731,453 | Field | Jan. 17, 1956 |